(12) United States Patent
Geisler et al.

(10) Patent No.: US 6,400,383 B1
(45) Date of Patent: *Jun. 4, 2002

(54) METHOD AND APPARATUS FOR EXPLORING A MULTI-ELEMENT DESIGN THROUGH USER DIRECTED SELECTIVE RENDERING

(76) Inventors: Stephen J. Geisler, 13448 NE. Denbrook Rd., Aurora, OR (US) 97002; Geetha Pannala, 8332 SW. Langtreest, Tigard, OR (US) 97224

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/195,070

(22) Filed: Nov. 17, 1998

(51) Int. Cl.⁷ .............................. G06F 3/14; G06F 17/50
(52) U.S. Cl. ..................... 345/855; 345/853; 345/854; 345/817; 345/818; 345/964; 700/121; 700/97
(58) Field of Search .................. 345/356, 964, 345/357, 353, 965, 969, 339, 333, 334, 348, 349, 341, 855, 854, 853, 828; 700/121, 97, 83, 85; 707/104, 501, 502

(56) References Cited

U.S. PATENT DOCUMENTS

| | | | | |
|---|---|---|---|---|
| 4,613,946 A | * | 9/1986 | Forman | 345/356 |
| 5,359,523 A | * | 10/1994 | Talbott et al. | 700/97 |
| 5,515,487 A | * | 5/1996 | Beaudet et al. | 345/356 X |
| 5,864,865 A | * | 1/1999 | Lakis | 707/104 X |
| 6,040,834 A | * | 3/2000 | Jain et al. | 345/356 |
| 6,111,578 A | * | 8/2000 | Tesler | 345/356 |
| 6,128,016 A | * | 10/2000 | Coelho et al. | 345/356 X |
| 6,189,019 B1 | * | 2/2001 | Blumer et al. | 345/357 X |

\* cited by examiner

*Primary Examiner*—Raymond J. Bayerl
(74) *Attorney, Agent, or Firm*—Columbia IP Law Group, PC

(57) ABSTRACT

An element selection is made in reference to a first graphical display showing a first subset of elements of a design having a number of elements coupled to one another. The selection is learned. In response, a second graphical display is provided. The second graphical display shows a second subset of the elements of the design, including at least a number of elements that are not part of the first subset but having an informational nexus to the selected element. As a result, a designer may selectively explore a complex design at the designer's direction.

23 Claims, 6 Drawing Sheets

METHOD AND APPARATUS FOR EXPLORING A MULTI-ELEMENT DESIGN THROUGH USER DIRECTED SELECTIVE RENDERING

BACKGROUND OF THE INVENTION

1. Field of the Invention

The present invention relates to the field of computer aided design tools. More specifically, the present invention relates to methods and apparatuses associated with assisting a designer in exploring a multi-element design, e.g., an integrated circuit (IC) having a large number of interconnected circuit elements.

2. Background Information

As price/performance of computing technology continues to improve, increasingly, computers are employed to assist a designer in performing various design tasks. As a result, designers are able to engage more complex designs, which in turn lead to greater demand for computerized assistance.

For example, in the design and fabrication of ICs, improvements in the price/performance of computing technology have made IC desing, as well as IC fabrication processes, more automated. As a result, increasingly more complex ICs, having multiple millions of transistors, are being designed and fabricated. In turn, the IC designers have become more reliant on electronic design automation (EDA) tools to assist them in managing the complexity and diagnosing design problems, to sustain their productivity and effectiveness. More specifically, in the area of IC design, virtually all complex IC designs are being synthesized employing synthesis tools. Typically, a circuit designer would specify an IC design on a textual basis, employing one of a number of high level hardware languages, such as Very High Speed Integrated Circuits (VHSIC) Hardware Design Language (VHDL). The text based design specification is in turn provided to a synthesis tool to generate the circuit elements and their interconnections. Most synthesis tools will generate complementary schematic diagrams for the textually specified design. However, by virtue of the complexity of the design and the fact that the designer has specified the design in a textual approach, the schematic diagrams are usually very large, very difficult to manipulate, and very hard for the designer to comprehend or use to aid in diagnosing a design problem. Thus, more computerized assistance is required to enable the designer to utilize these schematics effectively. Various design and diagnostic tools have emerged to provide such assistance. Some are able to generate functional block diagrams to supplement the huge unwieldy schematics, while other diagnostic tools will report critical paths or design problems, such as timing violations, in graphical form. Nevertheless, circuit designers have found the current generation of EDA tools to be inadequate in their flexibility in assisting them in dealing with the ever more complex IC designs.

Similar problems exist in other fields. For examples, in understanding or managing the wiring of complex machinery, such as the space shuttle, or a commercial airliner, or in the understanding/management of cabling for a complex communication network having a large number of "nodes".

Thus, a more effective and user friendly approach to assisting designers in exploring or analyzing complex designs is desired.

SUMMARY OF THE INVENTION

In accordance with the present invention, an element selection is made in reference to a first graphical display showing a first subset of elements of a design having a number of elements coupled to one another. The selection is learned. In response, a second graphical display is provided. The second graphical display shows a second subset of the elements of the design, including at least a number of elements that are not part of the first subset but having an informational nexus to the selected element. As a result, a designer may selectively explore a complex design at the designer's direction.

In one embodiment, the elements having an information nexus to the selected element are elements that are coupled to the selected element by at most n-1 degree(s) of indirection, n being an integer and may be dynamically set. Furthermore, they are included into the first subset to form the second subset.

In one embodiment, the design is a circuit design, and the elements are circuit elements of a circuit design.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as tables, files, data and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of a digital system; and the term digital system include general purpose as well as special purpose data processing machines, systems, and the like, that are standalone, adjunct or embedded.

Various operations will be described as multiple discrete steps performed in turn in a manner that is most helpful in understanding the present invention, however, the order of description should not be construed as to imply that these operations are necessarily performed in the order they are presented, or order dependent.

Figure 1:
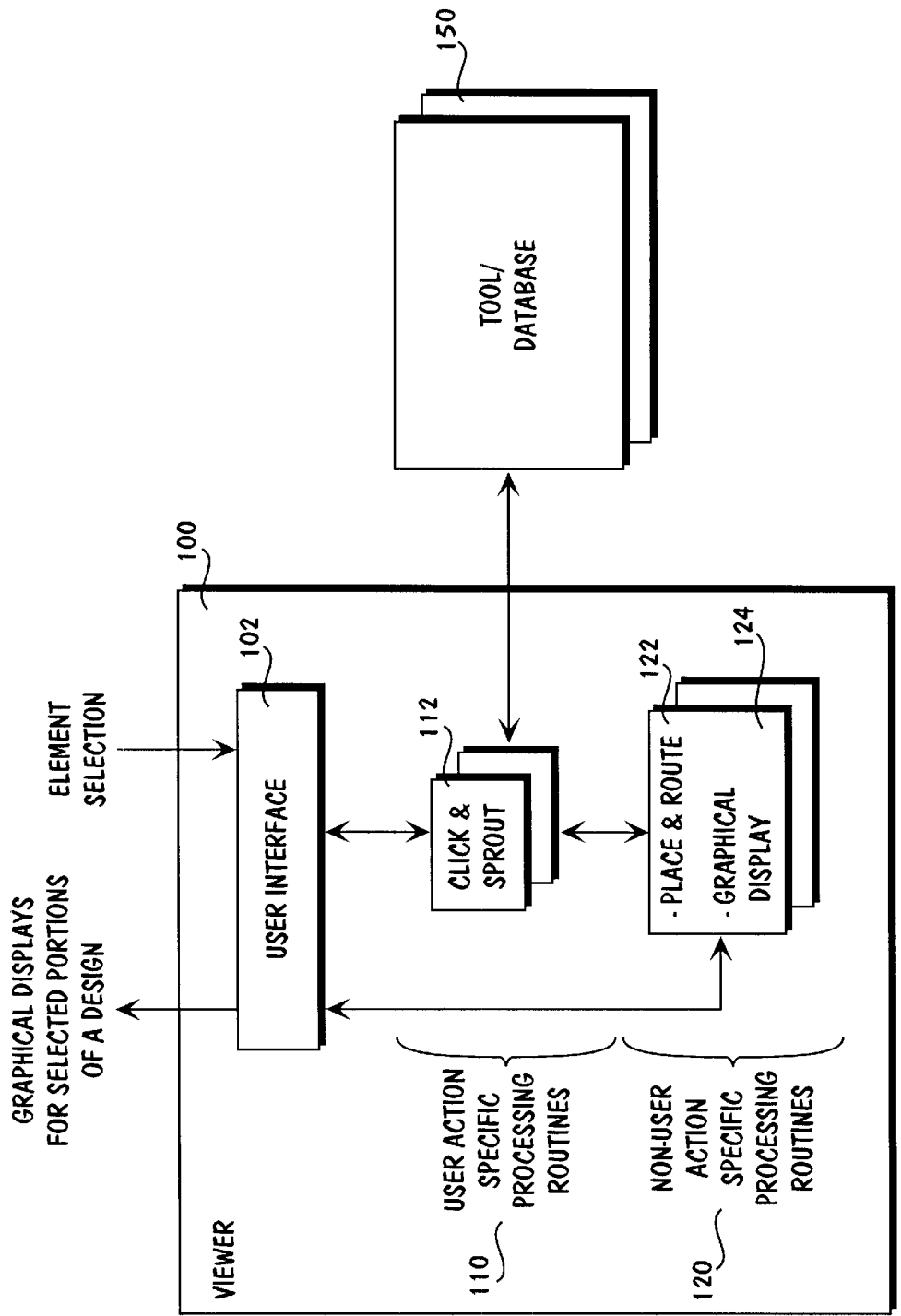
FIG. 1 provides an overview of the present invention in accordance with one embodiment.

Referring now to FIG. 1, wherein an overview of the present invention in accordance with one embodiment is shown. As illustrated, in accordance with the present invention, viewer 100, leveraging on a design automation tool/database 150, advantageously facilitates exploration of a multi-element design by a designer under the designer's direction. Viewer 100 successively renders graphical displays of the design for the designer, showing selected ones of the elements of the design obtained from tool/database 150, responsive to the designer's interactions with the rendered graphical displays. As will be described in more details below, in response to learning of an element selection made in reference to a rendered graphical display showing a first subset of the elements of a design, viewer 100 causes a replacement graphical display to be provided. The replacement graphical display shows a second subset of the elements of the design, including at least a number of elements that are not part of the first subset, but having an informational nexus to the selected element.

As discussed earlier in the background section, the multi-element design may be an IC design having a large number of circuit elements interconnected to one another, or a wiring design for a complex machinery having a large number of components coupled to one another, or a cabling design for a large communication network having a large number of nodes coupled to one another. Thus, the term "design" as used herein is intended to represent a broad range of multi-element designs having like kind of characteristics, and the term "element" as used herein is intended to include meanings of other like-terms such as "component" and so forth.

Continuing to refer to FIG. 1, for the illustrated embodiment, viewer 100 includes user interface 102, user action specific processing routines 110 and non-user action specific processing routines 120. User action specific processing routines 110 include in particular "click and sprout" processing routine 112, whereas non-user action specific processing routines 120 include in particular "place and route" routine 122 and graphical display routine 124. These elements are "operationally coupled" to each other as shown.

Figure 2A:
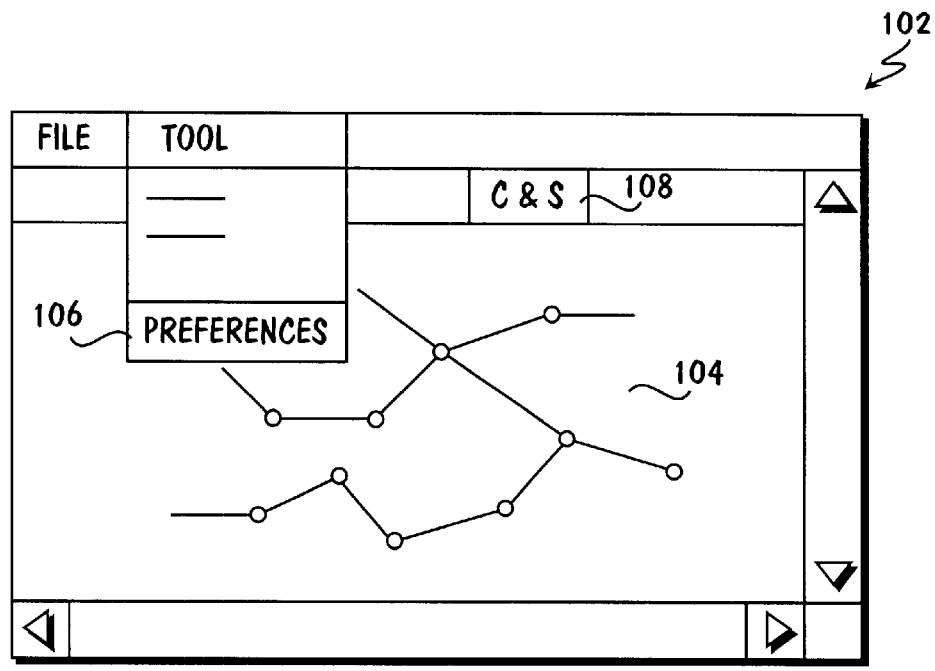
FIGS. 2a–2b illustrates an exemplary embodiment of the user interface of FIG. 1.
Figure 2B:
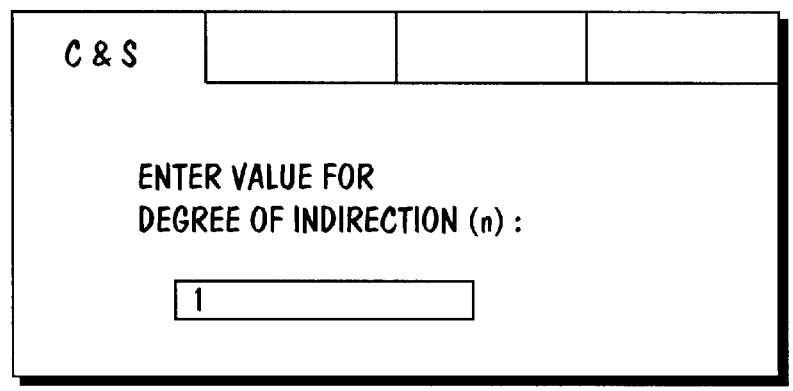

User interface 102 performs its conventional function of interfacing with the user, e.g. the designer, displaying outputs for the designer and accepting inputs from the designer. An exemplary one of user interface 102, showing an exemplary graphical display 104 of selected circuit elements of a circuit design, including in particular, preference setting option 106 and "click and sprout" control button 108, is shown in FIG. 2a. Preference setting option 106, as illustrated in FIG. 2b, includes in particular facilities for setting an operational value for the "degree of indirection" to practice the illustrated embodiment of the present invention, also to be described more fully below. In other embodiments, user interface 102 may also include other command menus as well as other control buttons, such as above described "scroll up/down", "zoom", and so forth.

Referring back to FIG. 1, "click and sprout" processing routine 112 is used to generate the element content of the replacement graphical display, responsive to the selection of the "click and sprout" button by the designer. Recall from earlier description, the element content includes at least selected ones of the elements that are not part of the element content of the current graphical display, but having informational nexus to the selected element. For the illustrated embodiment, these elements are elements that are not part of the element content of the current graphical display, but interconnected to the selected element by at most n-1 degree(s) of indirection, where n is an integer and may be dynamically set using preference setting option 106 of user interface 102. Moreover, for the illustrated embodiment, these elements are added to the element content of the current graphical display to form the element content of the replacement graphical display. In other words, the illustrated embodiment enables the designer to incrementally explore the design under his/her direction. Note that with the inclusion of the added elements, the replacement graphical display may have to be scrolled up/down or left/right in order to see the entire content. In other embodiments, the present invention may be practiced with other informational nexus. The elements having the requisite informational nexus may replace or be merged with the element content of the current graphical display, resulting in the exclusion of some of the elements of the element content of the current graphical display, as opposed to the straight addition to the element content of the current graphical display of the illustrated embodiment described earlier.

Additionally, for the illustrated embodiment, "click and sprout" processing routine 112 is "operationally coupled" to user interface 102 by way of the input notification services of an underlying operating system (not shown). Furthermore, "click and sprout" processing routine 112 obtains the selected ones of the elements that are not part of the element content of the current graphical display, but having the requisite informational nexus to the selected element from tool/database 150.

Place and route routine 126 is used to place and route the elements of the newly added elements of the element content of the next graphical display. Graphical display 124 is used to render the graphical displays including the previously as well as the newly placed and routed elements. As described earlier, tool/database 150 is used to supply "click and sprout" routine 112 with the elements having the requisite informational nexus to the selected element. Both place and route routine 122 and graphical display 124 are intended to represent a broad category of these routines known in the art. In he case of graphical display 124, for the illustrated embodiment, it is "operationally coupled" to user interface 102 by way of the rendering services of the underlying operating also. Similarly, tool/database 150 is also intended to represent a broad category of design tools/databases known in the art. An example of such tools/databases is the Calibre™ product available from Mentor Graphics Corp., of Wilsonville, Oreg., for deep submicron IC design. Accordingly, neither place and route routine 122, graphical display routine 124, nor tool/database 150 will be further described.

Figure 3:
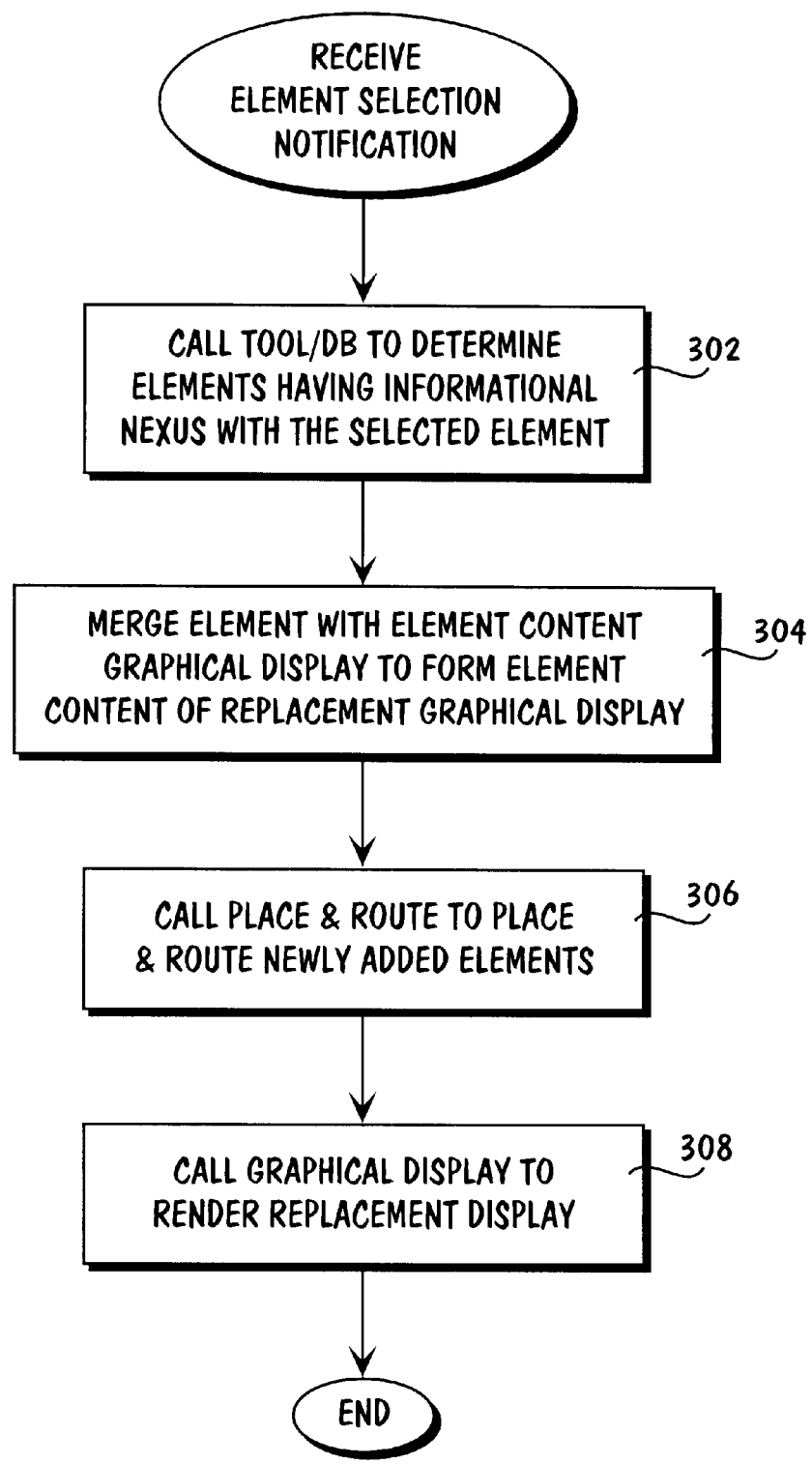
FIG. 3 illustrates one embodiment of the operational steps of the "click and sprout" routine of FIG. 1.

Referring now to FIG. 3, wherein a block diagram illustrating the operational steps of "click and sprout" routine 112 of FIG. 1 in accordance with one embodiment is shown. As illustrated, at step 302, "click and sprout" routine 112, in response to the receipt of an element selection notification (in reference to a first graphical display of a design), calls tool/database 150 to obtain the elements having the requisite informational nexus to the selected element. As described earlier, in one embodiment, "click and sprout" routine 112 queries tool/database 150 for the elements interconnected to the selected element with at most n-1 degree(s) of indirection. Upon receipt of the elements with the requisite informational nexus, at step 304, "click and sprout" routine 112 merges the received elements with the element content of the current graphical display to form the element content of the replacement graphical display.

Having formed the element content of the replacement graphical display, at step 306, "click and sprout" routine 112 calls "place and route" routine 122 to place and route the newly added elements. Upon placement and routing of the newly added elements, at step 308, "click and sprout" routine 112 calls graphical display routine 124 to render the replacement graphical display.

Figure 4:
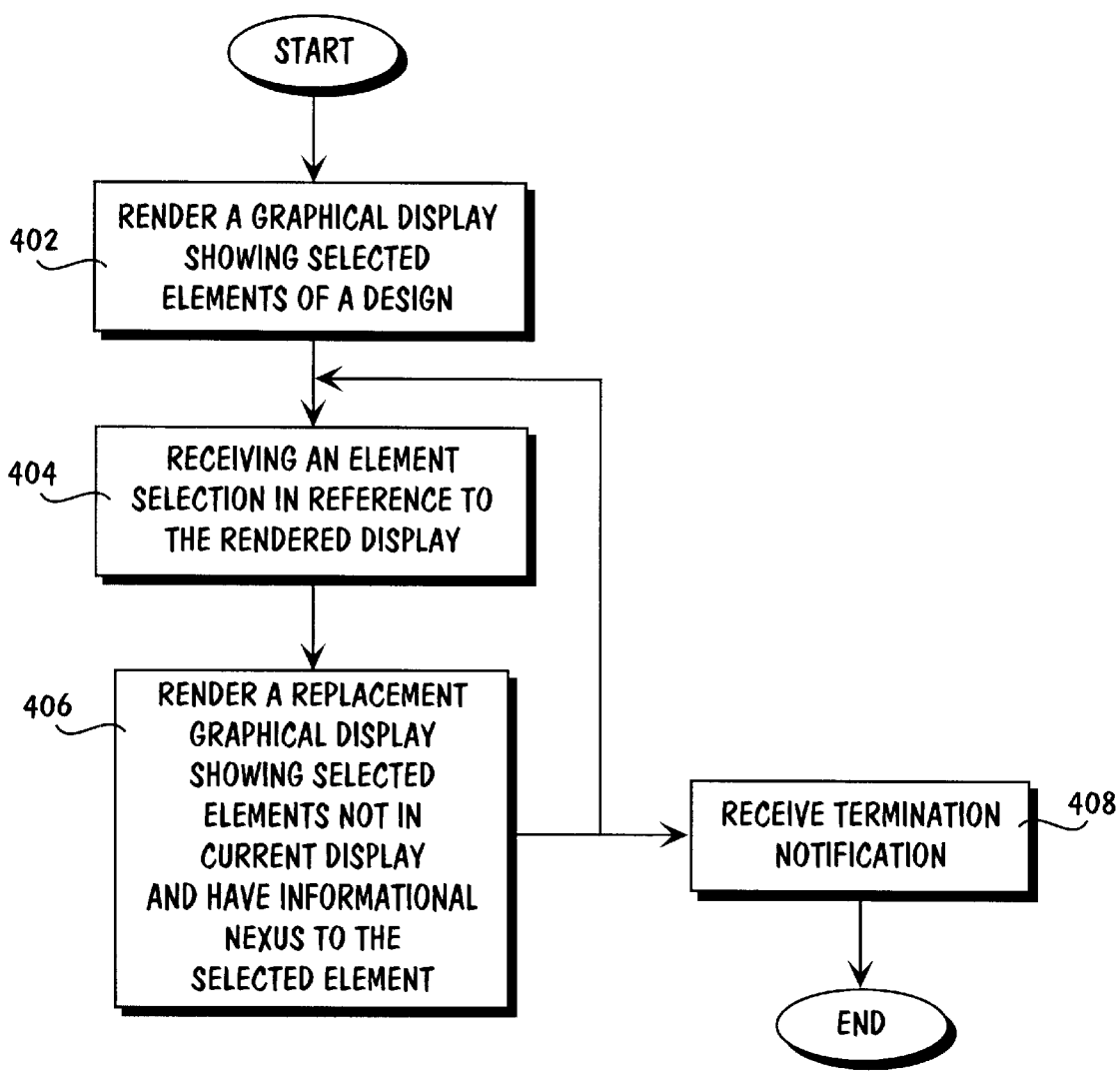
FIG. 4 illustrates the method steps of the present invention in accordance with one embodiment.

Refer now to FIG. 4, wherein a block diagram illustrating the method steps of the present invention in accordance with one embodiment is shown. As illustrated, at step 402, a graphical display showing selected elements of a design is first rendered for a designer. Then, at step 404, an element selection in reference to the rendered graphical display is received from the designer. In response, at step 406, a replacement graphical display is rendered for the designer. The replacement graphical display, as described earlier, shows at least elements that are not part of the element content of the earlier rendered graphical display, but having certain requisite informational nexus to the selected element. Steps 404–406 are repeated as many times as they are necessary to facilitate the designer's exploration of the desing. The process eventually terminates if a termination notification is received, step 408.

Figure 5A:
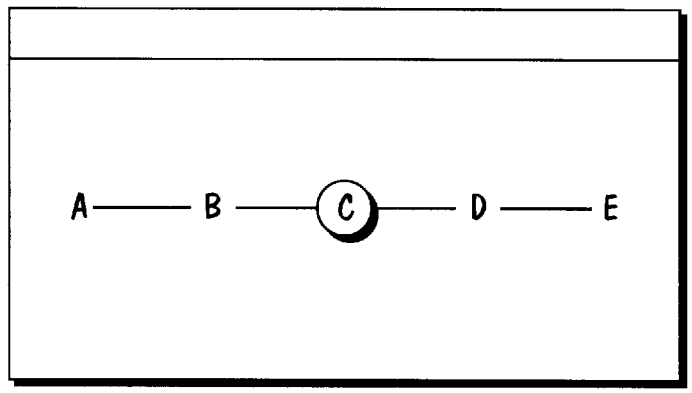
FIGS. 5a–5c illustrate an exemplary application of the present invention.
Figure 5B:
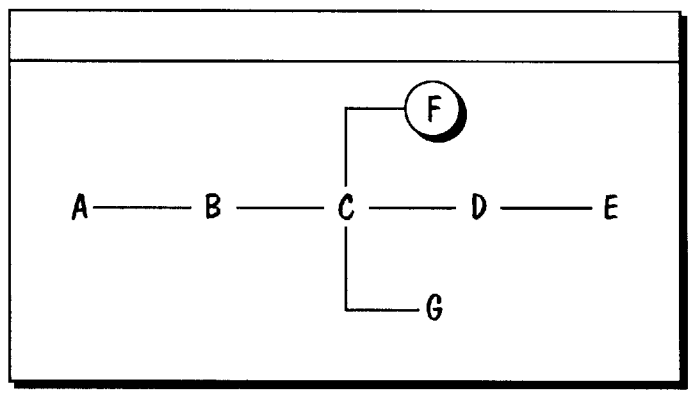
Figure 5C:
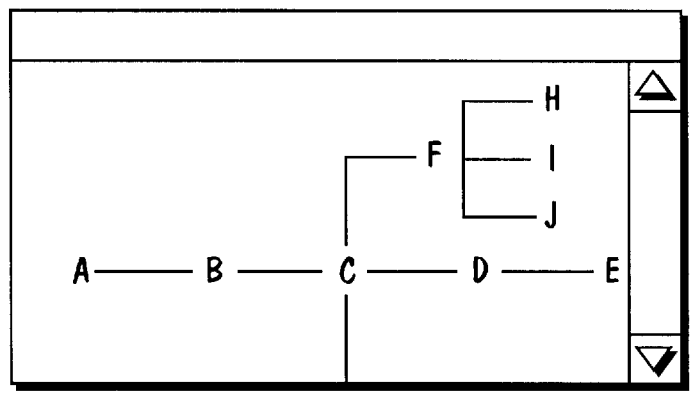

FIGS. 5a–5c illustrate an exemplary application of the present invention to IC design. Shown in FIG. 5a is a first graphical display showing circuit elements A-E of a circuit design. The first graphical display may be rendered for the circuit designer for a variety of reasons, e.g. the path including elements A-E incurs certain time violation. In response to the selection of circuit element C by the circuit designer, a second graphical display further including element F and G is rendered for the circuit designer, FIG. 5b. For the exemplary illustration, elements F and G are directly interconnected to element C (i.e. the informational nexus being circuit elements interconnect to the selected circuit element by at most zero degree of indirection). Next, in response to the selection of circuit element F by circuit designer, a third graphical display further including element H, I and J is rendered for the circuit designer, FIG. 5c. Elements H, I and J are also directly interconnected to element F. Note that for the exemplary illustration, upon the addition of elements H-J, by virtue of their placement and routing, "scrolling down" is required to see element G. Those, skilled in the art will appreciate that in real life, the schematics of IC designs are much more complicated than the illustrated exemplary application. Nevertheless, the exemplary application demonstrates the principle of facilitating incremental exploration by the circuit designer under his/her direction. More importantly, those skilled in the art will appreciate that the approach greatly simplifies the complexity confronting the circuit designer, allowing the circuit designer to gradually increase the complexity at his/her own pace, and of his/her own choosing.

Figure 6:
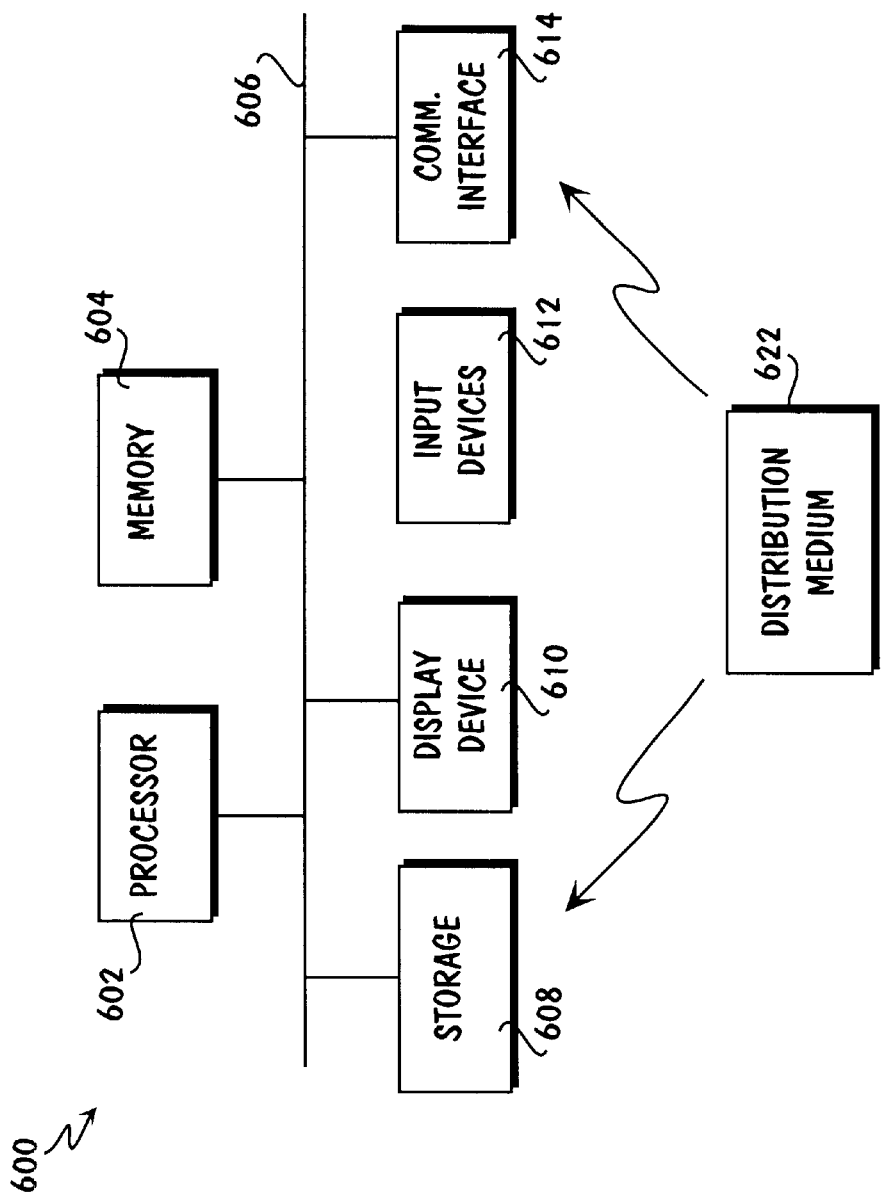
FIG. 6 illustrates one embodiment of an exemplary computer system suitable for use to practice the present invention.

FIG. 6 illustrates one embodiment of an exemplary computer system suitable for use to practice the present invention. As shown, exemplary computer system 600 includes processor 602 and system memory 604 coupled to each other via system bus 606. Coupled also system bus 606 are non-volatile storage 608, display device 610, input/output devices 612, and communication interface 614. Each of these elements perform its conventional functions known in the art. In particular, system memory 604 and non-volatile storage 608 are employed to store a working copy and a permanent copy of the programming instructions implementing the teachings of the present invention. The permanent copy of the programming instructions may be loaded into non-volatile storage 608 in the factory, or in the field, through distribution medium 622 or through communication interface 614. As described earlier, any one of a number of recordable medium such as tapes and so forth may be employed. The constitution of these elements 602–622 are also well known, and accordingly will not be further described.

Thus, a method and apparatus for facilitating design exploration through user directed selective rendering has been described. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A computer implemented method comprising:

receiving a notification conveying a user's selection of an element that is a part of a first graphical display of a circuit design having a plurality of elements coupled to one another, the first graphical display showing a first subset of the elements of the design; and in response to said notification, without further user action, determining a second subset of the elements of the circuit design to form a second graphical display, with the second subset to include at least a number of elements that are not part of the first subset but having an informational nexus to the selected element of multiple degrees of indirection, with said degrees of indirection determined on at least one input and at least one output of the selected element.

2. The computer implemented method of claim 1, wherein the method further comprises dynamically accepting a setting for the number of said multiple degrees of indirection.

3. The computer implemented method of claim 1, wherein said determining includes interacting with a tool/database to identify elements that are coupled to the selected element by the multiple degrees of indirection.

4. The computer implemented method of claim 1, wherein the determination is made in accordance with an incremental inclusion policy that provides for incrementally including into the first subset, a number of elements that are not part of the first subset but coupled to the selected element by the multiple degrees of indirection to form the second subset.

5. The computer implemented method of claim 1, wherein the method further includes generating placements as well as couplings for at least the elements that are not part of the first subset.

6. The computer implemented method of claim 1, wherein the method further comprises rendering the first graphical display, and rendering the second graphical display for a user.

7. The computer implemented method of claim 6, wherein the method further comprises upon rendering the first graphical display, facilitating the user to trigger said selection notification by interacting with the first graphical display.

8. A computer system comprising:

a processor;

a storage medium coupled to the processor and having stored therein a plurality of programming instructions to be executed by the processor to cause a notification of a user's selection of an element to be received, the selected element being a part of a first graphical display showing a first subset of elements of a circuit design having a plurality of elements coupled to one another, and to cause a second subset of said elements of said circuit design for use to render a second graphical display to be determined in response to said notification, without further user action, the second subset including at least a number of elements that are not part of the first subset but having an informational nexus to the selected element of multiple degrees of indirection, with said degrees of indirection determined on at least one input and at least one output of the selected element.

9. The computer system of claim 8, wherein said execution of the programming instructions further cause a setting for the number of said multiple degrees of indirection to be dynamically accepted.

10. The computer system of claim 8, wherein said determining includes interacting with a tool/database to identify said elements that are coupled to the selected element by the multiple degrees of indirection.

11. The computer system of claim 8, wherein the determination is made in accordance with an incremental inclusion policy that provides for incrementally including into the first subset, a number of elements that are not part of the first subset but coupled to the selected element by the multiple degrees of indirection to form the second subset.

12. The computer system of claim 8, wherein said execution of the programming instructions further causes placements as well as couplings to be generated for at least the elements that are not part of the first subset.

13. The computer system of claim 8, wherein the computer system further comprises a display coupled to the processor to render the first and the second graphical displays for a user.

14. The computer system of claim 13, wherein the computer system further comprises an input device to facilitate a user, upon rendering of the first graphical display, to trigger the selection notification by interacting with the first graphical display.

15. An article of manufacture comprising:
a recordable medium having recorded thereon a plurality of programming instructions for use to program an apparatus to enable the apparatus to be able to cause a notification of a selection of an element to be received, the selected element being a part of a first graphical display showing a first subset of elements of a circuit design having a plurality of elements coupled to one another, and to enable the apparatus to be able to cause a second subset of the elements of the circuit design for use to render a second graphical display to be determined in response, the second subset includes at least a number of elements that are not part of the first subset but having an informational nexus to the selected element of multiple degrees of indirection, with said degrees of indirection determined on at least one input and at least one output of the selected element.

16. The article of manufacture of claim 15, wherein the programming instructions further enable the apparatus to be able to dynamically accept a setting for the number of said multiple degrees of indirection.

17. The article of manufacture of claim 15, wherein said determining includes interacting with a tool/database to identify said elements that are coupled to the selected element by the multiple degrees of indirection.

18. The article of manufacture of claim 15, wherein the determination is performed in accordance with an incremental inclusion policy that provides for incrementally including into said first subset, a number of elements that are coupled to the selected element by the multiple degrees of indirection to form the second subset.

19. The article of manufacture of claim 15, wherein said programming instructions further enable the apparatus to cause placements as well as couplings to be generated for at least said elements that are not part of the first subset.

20. The article of manufacture of claim 15, wherein the programming instructions further enable the apparatus to be able to render the first and the second graphical displays for a user.

21. The article of manufacture of claim 20, wherein the programming instructions further enable the apparatus to be able to facilitate a user, upon rendering of the first graphical display, to trigger the notification selection by interacting with the first graphical display.

22. An apparatus comprising:
means for learning of an element selection by a user in reference to a first graphical display showing a first subset of elements of a circuit design having a plurality of elements coupled to one another; and means for responding, with no further user action, to the element selection, with a second graphical display showing a second subset of said elements of said circuit design including at least a number of elements that are not part of said first subset but having an informational nexus to the selected element of multiple degrees of indirection, with said degrees of indirection determined on at least one input and at least one output of the selected element.

23. A method comprising the steps of:
first step for learning an element selection by a user in reference to a first graphical display showing a first subset of elements of a circuit design having a plurality of elements coupled to one another; and second step for responding, with no further user action, to the element selection with a second graphical display showing a second subset of said elements of said circuit design including at least a number of elements that are not part of said first subset but having an informational nexus to the selected element of multiple degrees of indirection, with said degrees of indirection determined on at least one input and at least one output of the selected element.

* * * * *